United States Patent
Main et al.

(10) Patent No.: US 7,079,149 B2
(45) Date of Patent: Jul. 18, 2006

(54) SYSTEM, METHOD, AND DEVICE FOR ACCELERATED GRAPHICS PORT LINKING

(75) Inventors: Kevin K. Main, Plano, TX (US); Muhammad Afzal, McKinney, TX (US); Charles Michael Campbell, McKinney, TX (US); Harry W. Hartjes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/974,435

(22) Filed: Oct. 9, 2001

(65) Prior Publication Data

US 2003/0067470 A1    Apr. 10, 2003

(51) Int. Cl.
*G06F 13/14* (2006.01)
*G06F 13/00* (2006.01)

(52) U.S. Cl. ............................. 345/520; 710/303
(58) Field of Classification Search ................ 345/502, 345/503, 520, 533, 519; 710/100, 300, 302, 710/303, 304, 306, 311, 313, 315, 316
See application file for complete search history.

(56) References Cited

U.S. PATENT DOCUMENTS

| | | | | |
|---|---|---|---|---|
| 5,841,994 A | * | 11/1998 | Boesch et al. | 710/113 |
| 6,061,746 A | * | 5/2000 | Stanley et al. | 710/10 |
| 6,141,021 A | * | 10/2000 | Bickford et al. | 345/503 |
| 6,151,651 A | * | 11/2000 | Hewitt et al. | 710/315 |
| 6,161,157 A | * | 12/2000 | Tripathi et al. | 710/303 |
| 6,243,782 B1 | * | 6/2001 | Woolsey et al. | 710/310 |
| 6,292,859 B1 | * | 9/2001 | Santiago | 710/107 |
| 6,549,968 B1 | * | 4/2003 | Hart | 710/303 |
| 6,567,876 B1 | * | 5/2003 | Stufflebeam | 710/303 |
| 6,584,533 B1 | * | 6/2003 | Cho et al. | 710/303 |
| 6,654,826 B1 | * | 11/2003 | Cho et al. | 710/303 |
| 6,668,296 B1 | * | 12/2003 | Dougherty et al. | 710/303 |
| 6,675,248 B1 | * | 1/2004 | Olarig et al. | 710/305 |
| 6,675,251 B1 | * | 1/2004 | Streitenberger et al. | 710/306 |
| 6,724,389 B1 | * | 4/2004 | Wilen et al. | 345/520 |
| 6,725,310 B1 | * | 4/2004 | Shoobe et al. | 710/303 |
| 6,864,891 B1 | * | 3/2005 | Myers | 345/502 |

* cited by examiner

*Primary Examiner*—Kee M. Tung
(74) *Attorney, Agent, or Firm*—William B Kempler; W. James Brady, III; Frederick J. Telecky, Jr.

(57) ABSTRACT

The invention provides systems, devices, and methods for using more than one Accelerated Graphics Port (AGP) to process graphics for a single computer monitor (282). In one embodiment, the invention is a method of providing advanced/high-performance AGP capabilities to a laptop computer by intercepting AGP signals from a laptop having a low-power AGP (224) and converting the AGP signals to signals for a high-performance AGP (270).

16 Claims, 2 Drawing Sheets

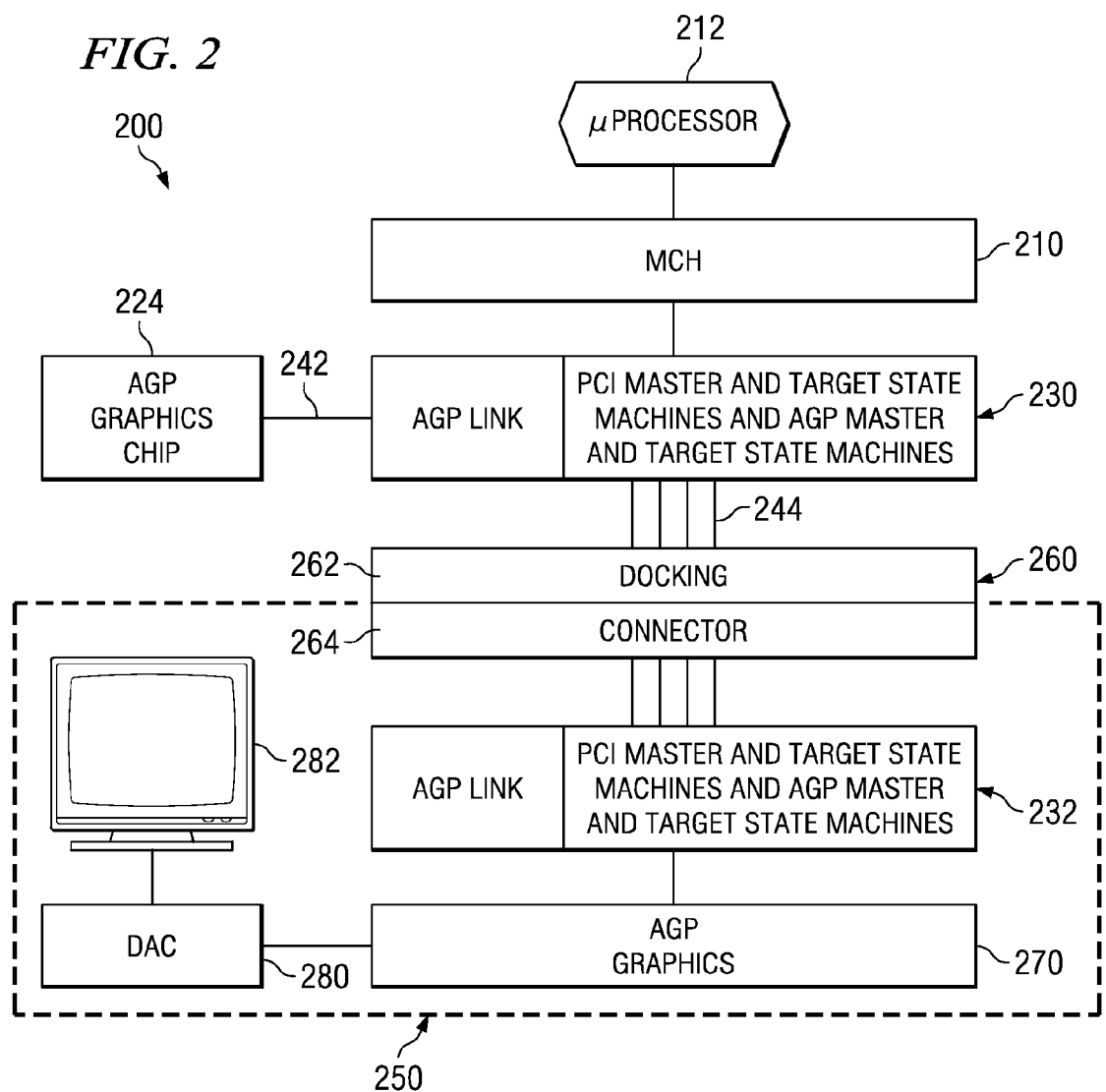
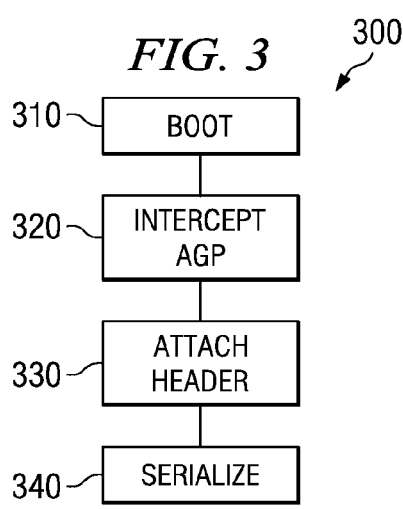

SYSTEM, METHOD, AND DEVICE FOR ACCELERATED GRAPHICS PORT LINKING

TECHNICAL FIELD

Generally, the invention relates to laptop computers and computer graphics, and more particularly, the invention relates to providing accelerated graphics port capabilities on a laptop computer platform.

BACKGROUND OF THE INVENTION

An Accelerated Graphics Port speeds up data transfer between a video card and Random Access Memory (RAM) when compared to standard graphics displays. In general, PCI makes the video card (or port) run at the same speed as other components in a computer system (such as the audio card, or the hard drive, for example). However, the AGP runs on a separate bus, so there is no superfluous data being transmitted to or from the video card. Similarly, AGP 2X, AGP 4X, and more generally, AGP "N"X provide a separate bus, at 2 or 4 or "N" times the speed of other computer system components. Thus, for example, the standard known as AGP 4X, has a 133 MHz bus (4×33 MHz) and provides state-of-the-art graphics for games, art, and image intense programs. However, there are limitations that prevent the advantages of higher-performance AGPs (high-AGP) from being realized on a laptop computer (or "laptop").

One obstacle to providing high-performance AGP to a laptop is that personal computer (PC) design guidelines require an AGP chip for the laptop, but allow for only one AGP chip at a time in a computer system. This means that a low power/low performance AGP chip is built into the laptop, and this precludes an additional AGP chip (a higher-performance AGP) from being remotely added to the laptop to improve AGP performance.

The electronics that support powerful graphics processing generate too much heat to place high-performance AGP in a laptop. In addition, a powerful graphics processing requires significant amounts of power. Accordingly, even if heat constraints were ignored and a high-AGP were used in a laptop, the laptop's battery would discharge very quickly. Thus, computer users who prefer laptops because of the portability and space advantages offered by laptops do not get to enjoy the advanced 3D graphics provided by high-performance AGPs. Accordingly, it would be advantageous to provide devices and methods for providing high-performance AGP quality graphics to laptop computers.

SUMMARY OF THE INVENTION

The invention provides technical advantages as an AGP Link device that enables the integration of AGP on a laptop. In one embodiment, the AGP Link device is embodied as an AGP Link chip that enables a laptop to experience AGP graphics performance via a docking station. As an alternative embodiment, the invention is a method of using an AGP Link chip to provide AGP graphics to a laptop by using a docking station. Accordingly, the invention provides AGP capabilities to a laptop, thus allowing a laptop user to enjoy the benefits of laptop portability and size, while enjoying the visual advantages of an AGP.

In one embodiment the present invention is advanced graphics port (AGP) link chip. The AGP link chip includes a first serial port coupled to logic, a first parallel port coupled to the logic, and a second parallel port coupled to the logic. The logic is preferably capable of intercepting an AGP signal and reconfiguring a header portion of the AGP signal.

In another embodiment, the invention is a system for providing a high performance accelerated graphics port (AGP) to a laptop computer. The system includes a processor, and an AGP link chip coupled to the processor via a memory control hub.

In yet another embodiment, the invention is a method of providing a high performance accelerated graphics port (AGP) to a laptop computer. The method includes intercepting an AGP signal, attaching a header to the AGP signal, serializing the AGP signal so that a high performance AGP graphics chip powers a display when a laptop is docked with a docking station having a high performance AGP graphics chip, so that a low performance AGP graphics chip in the laptop powers a display when a laptop is not docked. Of course, other features and embodiments of the invention will be apparent to those of ordinary skill in the art. After reading the specification, and the detailed description of the exemplary embodiment, these persons will recognize that similar results can be achieved in not dissimilar ways.

Accordingly, the detailed description is provided as an example of the best mode of the invention, and it should be understood that the invention is not limited by the detailed description. Furthermore, the invention should be read as being limited only by the claims.

BRIEF DESCRIPTION OF THE DRAWINGS

Various aspects of the invention, as well as an embodiment, are better understood by reference to the following DETAILED DESCRIPTION. To better understand the invention, the DETAILED DESCRIPTION should be read in conjunction with the drawings in which:

FIG. 2 illustrates a block diagram of a laptop coupled to a docking station at an AGP, and FIG. 3 is a block-flow diagram of an AGP link algorithm.

DETAILED DESCRIPTION

Figure 1:
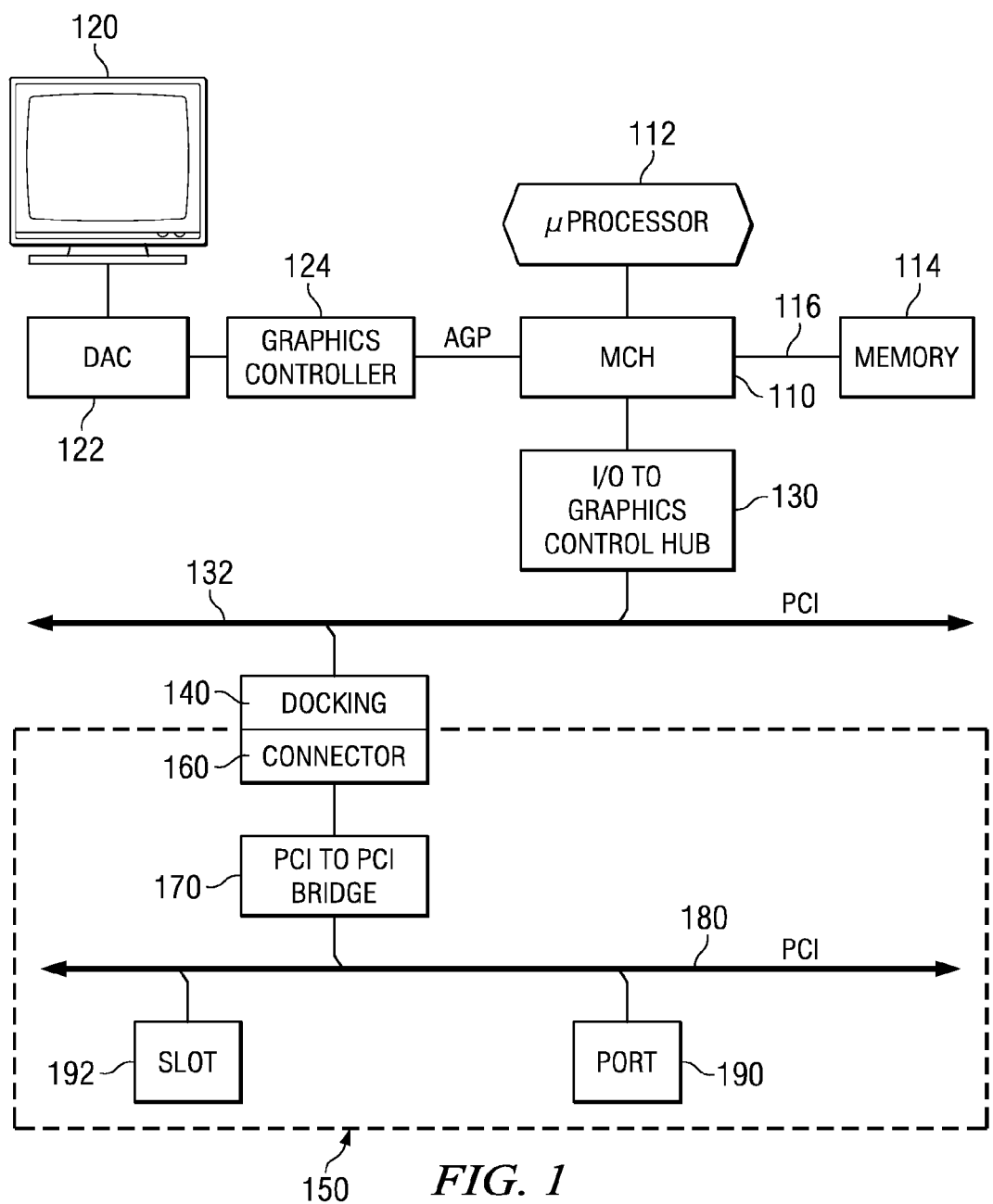
FIG. 1 is a component block diagram of a layout of a laptop connected to a docking station.

The invention provides systems, devices, and methods for using more than one Accelerated Graphics Port (AGP) to process graphics for a single computer monitor. In one embodiment, the invention is a method of providing advanced/high-performance AGP capabilities to a laptop computer by intercepting AGP signals from a laptop and converting the AGP signals to signals from a high-performance AGP maintained remotely from the laptop, preferably in a docking station. In another embodiment, the invention is a graphics control chip that intercepts AGP signals and wraps a new header, or changes the existing header, so that a chosen display will use a high-performance AGP chip when the laptop is coupled to a docking station. In yet a further embodiment, the invention busses, a is a system that incorporates a graphics control chip with multiple AGP busses, computer and a docking station. Accordingly, the invention provides the previously unknown advantages of high-performance AGP graphics to a laptop display.

When using a computer as a workstation such as at home or at an office, a user typically wants high performance and large peripherals, such as a large monitor, a large keyboard, and a mouse, for example. However, such items are difficult to carry around, and thus are not integrated into portable devices, such as laptops. Accordingly, the advantages of large peripherals are provided to laptop users by using a device known as a docking station. In general, a docking station provides cable management by incorporating "docking ports" that mate (or "plug") on one side directly to a laptop, The opposite side of these ports mate directly to peripherals. More advanced docking stations provide expansion options, such as PCI add-in slots.

FIG. 1 is a component block diagram of a layout of a laptop connected to a docking station. In general, a memory control hub (MCH) 110 (also known as a "north bridge") comprises part of a laptop chipset 100, and is typically the part of the laptop chipset 100 that is the closest to a processor 112. The MCH 110 provides the core logic and programming used to support memory 114, and maintains advanced graphics port (AGP) protocols and logic for communication with a graphics controller 124. Furthermore, the MCH 110 provides logic and 5 programming for communication with a south bridge 130 (also known as an I/O controller hub).

The processor 112 may be a microprocessor such as a Pentium, Strong Arm, or Athlon microprocessor, or may be a digital signal processor, for example. Memory 114 may be any type of programmable memory, such as RAM, or a separate memory device. The graphics controller 124 controls graphics output via a digital-to-analog converter (DAC) 122, and the analog output of the DAC 122 is used by a monitor 120 to provide a viewable output to a user. The south bridge 130 maintains logic and programming for communication with a PCI bus 132 that is also maintained in the laptop.

Coupled to the PCI bus is a docking station port 140. The docking station port 140 provides the electrical connection to a docking station 150 via a docking station receiving port 160 (accordingly, the components comprising the layout of the docking station 150 are generally referred to by the referred to block diagram 150). The a docking station receiving port 160 is likewise coupled to a PCI to PCI bridge 170. The PCI-to-PCI bridge 170 that converts signals received on the docking station receiving port 160 into signals appropriate for a docking-station based PCI bus 180. The docking station 150 provides expansion and additional peripherals via ports and expansion slots such as a port 190, which may be an parallel or serial port, for example, or an expansion slot, for example.

The invention provides the advantages of a high-performance AGP to a laptop via a docking station. Accordingly, advantages of the invention may be understood by reference to FIG. 2, which illustrates a block diagram of a laptop 200 coupled to a docking station 250 via an AGP link set 270. In general, an AGP link 230 has two AGP port—a first AGP port 242, and a second AGP port 244. The first AGP port 242 couples a low-power AGP graphics chip 224 to the AGP link 230, and the second AGP port 244 couples the AGP link 230 to a high performance AGP graphics chip 270 through a docking connector 260 having a laptop portion 262 and a docking station portion 264.

Accordingly, when the laptop 200 is plugged into the docking station 250, the processor 212 uses the high-performance AGP graphics chip 270, and when the laptop is not connected to a docking station, the microprocessor uses the on-board low-power AGP graphics chip 224, although the processor does not necessarily know that the laptop is docked. Typically, when the high-performance AGP graphics chip 270 is employed, a monitor 282, which may be a high-definition device such as a LCD display, that is coupled to the high-performance AGP graphics chip via a DAC 280, displays the graphics output of the processor 212. However, it should be noted that some monitors are digitally based, and thus, an ADC is often optional.

Of course, the laptop 200 maintains the processor 212, such as a Pentium, or other processor, as discussed above, coupled to a memory controller hub 210 which in turn is coupled to the AGP link 230. It should be understood that a laptop comprises many other systems and chips, which are well known in the art and are necessary for understanding the invention.

An AGP link chip (generally) is preferably embodied as a single chip having the ability to be configured for a laptop implementation or a docking station implementation. Of course, it should be understood that separate AGP link chips may be used for the docking station and the laptop, and such an implementation is within the scope of the invention. The AGP link 230 enables a laptop processor to access high-performance graphics by using an off-board (or remote) high-performance AGP chip. In one embodiment, the AGP link 230 is embodied as a multi-port bridge, and in a preferred embodiment, the AGP link 230 is a three-port bridge having two parallel ports and one serial port. In this embodiment, a first parallel port may, in a first mode (a mother-board mode), provide connectivity between the AGP link 230 and an onboard graphics accelerator. Similarly, in a second mode (a docking station mode), the first parallel port connects the AGP link 230 to a docked graphics accelerator.

In one embodiment, when the notebook is not docked, the first parallel AGP port signals are routed directly to a second parallel AGP port, preferably via a repeater. If the notebook is docked, then the first parallel port includes two modes. In a first mode, the first parallel port forwards data to a data processing block (not shown). In a second mode, the first parallel port forwards data to the serial port.

A serial port provides a serial interface between the AGP link 230 in the notebook 200, and a second AGP link 232 in the docking station 250. When docked, the serial port processes requests from a graphics accelerator in the docking station connected to the first parallel port via a serial link. In one embodiment, the data is accepted from the graphics accelerator in a parallel format, packetized, encoded, and transmitted to the serial port in the AGP link 230 over a serial link. The serial port on the AGP link 230 de-serializes, decodes, and de-packetizes the data and sends it to a data processing block for processing. The AGP link's first serial port also accepts data from the processing block and transmits it to the serial port.

In a preferred embodiment, an AGP link provides a second parallel AGP port that provides an interface between the AGP link and core logic. The second parallel port communicates requests from the first parallel port or the serial port to core logic. In one embodiment, the second parallel port incorporates PCI master and target state machines as well as AGP master and target state machines 231, 233. In a secondary mode, the second parallel port is disabled. When not docked, the outputs of the first parallel port connect directly to the inputs of the second parallel port via a repeater.

Preferably, software and logic maintained by an AGP link is capable of "fooling" a MCH and a processor into not detecting the AGP link, and into "thinking" that the selected AGP graphics chip (also known as the selected AGP graphics chip) is the only graphics chip running graphics on the computer system (the computer believes that the graphics chip selected by the AGP link is the graphics chip the computer is attached to). One general operation of an AGP link chip can be generalized as an AGP link chip algorithm. FIG. 3 is a block-flow diagram of an AGP link algorithm (the algorithm) 300.

The algorithm 300 begins with a boot act 310 in which the AGP link chip configures the AGP ports/busses to accommodate the appropriate AGP link chip by setting clock frequencies and voltage levels. In a preferred embodiment, the AGP link chip intercepts signals from the host processor and system, and responds by "lieing" to the host system by claiming to be a high-performance AGP graphics chip supported by a desktop. Then, the AGP link chip intercepts other configuration transactions as needed. The algorithm 300 proceeds to an intercept act 320. In the intercept act 320 the algorithm intercepts selected AGP signals. Then, in an attach header act 330, a packet header is attached to each intercepted AGP signal, as needed, to fool the computer system. After the attach header act 330, the algorithm 300 then serializes a packet containing an AGP signal (serialization of the AGP packets can avoid or solve electrical compatibility problems).

Sometimes methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An accelerated graphics port (AGP) link integrated circuit comprising:
   a first AGP graphics link integrated circuit comprising:
   a first parallel port couplable to a first AGP bus for receiving graphics data generated by a processor;
   second parallel port couplable to a AGP graphics processor for transmitting graphics data to the AGP graphics processor; and
   a serial port couplable to a serial port in a second AGP graphics link integrated circuit transmitting serializing AGP graphics data to the second AGP graphics link integrated circuit.

2. The AGP link integrated circuit of claim 1 wherein the second AGP graphics link integrated circuit is the same as the first AGP graphics link integrated circuit, the serial port of the second AGP graphics link integrated circuit receiving the serialized AGP graphics data.

3. The AGP link integrated circuit of claim 2 wherein the serial data received at the second AGP graphics link integrated circuit is deserialized and output on the second parallel port of the second AGP graphics link integrated circuit.

4. The AGP link integrated circuit of claim 2 wherein in a docked portable computer the first parallel port is coupled to a memory control hub of the portable computer and the serial port is coupled to a AGP graphics processor in a docking station.

5. The AGP link integrated circuit of claim 1 wherein in an undocked portable computer having a first AGP graphics processor, the first parallel port is coupled to a memory control hub of the portable computer and the second parallel port is coupled to the first AGP graphics processor of the portable computer.

6. The AGP link integrated circuit of claim 1 wherein in a docked portable computer the first parallel port is coupled to a memory control hub of the portable computer and the serial port is coupled to a AGP graphics processor in a docking station.

7. A portable computer capable of high performance graphics when docked to a docking station comprising:
   a processor;
   a memory control hub coupled to the processor;
   a accelerated graphics port (AGP) link integrated circuit having a first parallel port coupled to the memory control hub, a second parallel port coupled to
   a AGP graphics processor in the portable computer and a serial port couplable to a high performance AGP processor in the docking station, whereby the AGP graphics processor in the portable computer is utilized when the portable computer is not docked in the docking station and the high performance AGP processor is utilized when the portable computer is docked in the docking station.

8. A computer system comprising a portable computer comprising
   a processor;
   a memory control hub coupled to the processor;
   a first accelerated graphics port (AGP) link integrated circuit having a first parallel port coupled to the memory control hub for receiving graphics data, a second parallel port coupled to an AGP graphics processor in the portable computer and a serial port coupled to a first connector on the portable computer;
   a docking station comprising
   a second connector mateable with the first connector on the portable computer;
   a second AGP link integrated circuit having a serial port coupled to the second connector for receiving serialized graphics data from the portable computer and having a parallel port coupled to a high performance graphics processor.

9. The computer system of claim 8 wherein the first and second AGP link integrated circuits are identical circuits.

10. The computer system of claim 9 wherein the first parallel port of the first AGP link integrated circuit is not utilized when the portable computer is docked in the docking station.

11. The computer system of claim 9 further comprising a second parallel port on the second AGP link integrated circuit and wherein the first parallel port of the second AGP link integrated circuit is coupled to the high performance graphics processor and the second parallel port of the second AGP integrated circuit is not utilized.

12. The computer system of claim 8 wherein the first AGP link integrated circuit receives the data, packetizes the data, encodes and transmits the data.

13. The computer system of claim 12 wherein the second AGP link integrated circuit receives the serial data, decodes and depacketizes the data.

14. A method of providing a high performance accelerated graphics port (AGP) to a portable computer comprising:
   passing graphics data from a memory control hub in the portable computer through a first AGP link integrated circuit to an AGP graphics processor in the portable computer;
   Intercepting the graphics data in the AGP link integrated circuit when the portable computer is docked in a docking station;
   attaching a header to the graphics data;
   serializing the graphics data;

transmitting the serialized data over a serial link to a second AGP link integrated circuit in the docking station;
deserializing the data and removing the header from the graphics data;
providing the graphics data to a high performance graphics processor.

15. The method of claim 14 wherein the first and second AGP link integrated circuits are identical devices.

16. The method of claim 14 wherein the graphics data is provided to the high performance graphics processor via a parallel port on the second AGP link integrated circuit.

* * * * *